Patented Aug. 19, 1947

2,425,774

UNITED STATES PATENT OFFICE 2,425,774

POLYMERIC DYESTUFF INTERMEDIATES AND PROCESS FOR OBTAINING THE SAME

Cyril D. Wilson, Metuchen, N. J., assignor to E. I. du Pont de Nemours & Company, Wilmington, Del., a corporation of Delaware No Drawing. Application January 12, 1945, Serial No. 572,585

9 Claims. (Cl. 260—298)

1

This invention relates to new chemical compounds and to their preparation. More particularly, it relates to new dye intermediates and to their preparation and use.

An object of this invention is to provide new types of organic compounds. A further object is to provide a new class of dye intermediates. Still other objects will be apparent from the following description of the invention.

It has been found that new compounds can be made by reacting a heterocyclic nitrogen base with a polyfunctional organic compound containing a plurality of functional groups each of which is capable of forming quaternary ammonium salts with ternary nitrogen compounds. At least one mol of base is used for each functional group. The resulting products which contain a polyvalent organic radical between or linked to nitrogen atoms of the heterocyclic nitrogen compounds can be condensed with other compounds to form still other types or modified types of polymers.

The invention can be applied to a large and diverse group of heterocyclic nitrogen compounds containing (1) a trivalent heterocyclic nitrogen capable of forming quaternary or cyclammonium salts with alkyl salts, e. g., ethyl iodide, methyl-p-toluene sulfonate, etc., and (2) a reactive group. The resulting bis-, tris-, etc. or polyplex salts are new and useful compounds. Since they still contain reactive groups they can (a) be condensed with other dyestuff components to form bis, tris, or polymeric dyes or (b) condense with organic compounds to form intermediates with a different reactive group which may be subjected to a dye condensation reaction to form a polymeric dye.

Bis-type quaternary salts are of the general formula:

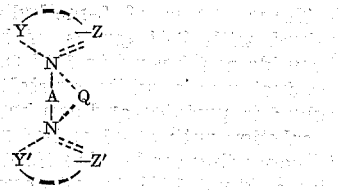

wherein A is a divalent substituted or unsubstituted hydrocarbon radical which is linked through aliphatic carbon atoms to the nitrogen atoms; Z and Z' are the same or different and constitute a reactive group capable of dye condensation and Y and Y' are the same or different and constitute the atoms necessary to complete a heterocyclic nitrogen nucleus and Q is 1 or 2

2 anions. One or both of the N atoms may be part of a salt group.

The invention will be more readily understood by a consideration of a more specific aspect thereof. A heterocyclic ammonium base containing a reactive group which can be used in cyanine dye condensations such as methyl benzothiazole is reacted with a polyfunctional agent such as propylene di-bromide and a bis-type quaternary salt is formed. The resulting salt contains two reactive groups. The reaction might be regarded as proceeding in accordance with the equation:

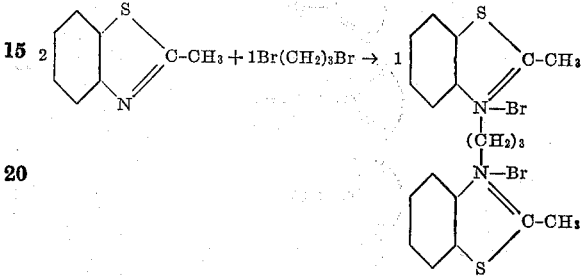

However, the compound α-methyl benzothiazole in some instances may be made to react as though it contains a reactive methylene group, whereupon the base could be regarded as having the formula:

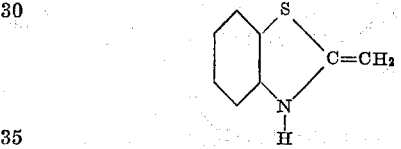

Based upon this formula, it is possible that the resulting bis-type quaternary salt might have one or two ternary nitrogen atoms by reason of one or two molecules of HBr splitting off if a strong base is present. Following this theory, it is possible that dye intermediates can be obtained having the formula:

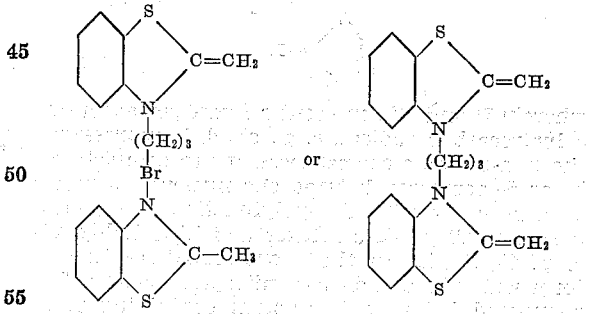

Compounds of the last-mentioned types can, of course, be prepared by heating bis-type salts with agents which will remove HBr or HX therefrom wherein X is an anion. Thus heating in the presence of a strong base such as caustic soda will result in the aforesaid compounds, the particular type depending upon the duration of reaction and concentration of reactants. Compounds of the last-mentioned type, which are bis or polyplex bases, however, do not undergo all of the dye condensation reactions which can be applied to those of the above equations.

The invention, in a broad sense, as before stated may be applied to any heterocyclic nitrogen base containing a reactive group which can be condensed to form a dye. In addition to reactive methyl and methylene groups mention is made of reactive halogen groups, alkyl-thio- and alkylselenoether groups; acylmethylene derivatives formed by the condensation of a reactive methyl group with an acyl halide, i. e., acetyl chloride, propionyl chloride, crotonyl chloride, benzoyl chloride, etc.; thione or selenone groups; nitrosoamine groups; β-anilinovinyl groups; amino groups; hydrazone groups, e. g., =N—NH$_2$; cyano groups; and α-ethyl groups, etc.

Some of the aspects of the invention are illustrated below wherein a heterocyclic nitrogen base having in one of its tautomeric forms one of the formulae:

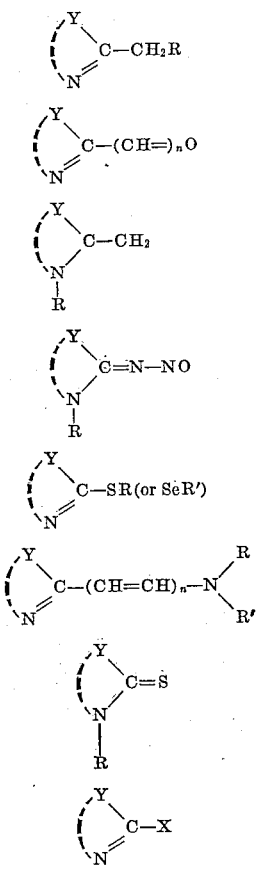

wherein R and R' represent a hydrogen atom or a hydrocarbon radical, e. g., alkyl, Y represents the non-metallic atoms necessary to complete a 5- or 6-membered heterocyclic nucleus; is used as a reactant with the polyfunctional reagent, $n$ is a small positive integer and X is halogen, e. g., Cl, Br, I. In the above formulae Y may form with the carbon and nitrogen atoms a 5-membered heterocyclic nucleus containing two nuclear non-metallic atoms other than carbon, one of which non-metallic atoms is trivalent nitrogen and the other a divalent non-metallic atom, such as oxygen, sulfur, selenium or a divalent hydrocarbon radical such as

wherein R$_1$ and R$_2$ are alkyl radicals; or a 6-membered heterocyclic nucleus containing one nuclear hetero atom, e. g., trivalent nitrogen and the balance carbon atoms.

By heterocyclic nucleus as described above, it is intended that both substituted and unsubstituted heterocyclic rings are included, including for instance, benzoxazoles, benzthiazoles, benzoselenazoles, benziminazoles, thiazoline and the corresponding naphthazoles and anthracenoazoles, etc., pyridine, quinoline, naphthopyridine, etc. Various types of substituents may be present in the benzene nuclei, e. g., hydrocarbon, hydroxy, alkoxy, amino and substituted amino groups. Substituents may also be present in the pyridine nuclei.

Various types of polyfunctional organic hydrocarbon compounds can be used in the production of the bis-type quaternary salts and bases. Among the useful bifunctional types are alkylene polyhalides, cycloalkylene polyhalides, alkyl esters of alkylene and cycloalkylene sulfonic acids, alkyl esters of arylene sulfonic acids, dialkyl esters of alkylene disulfuric acid and mixed compounds containing the above functional groups.

The invention will be more fully illustrated but is not intended to be limited by the following examples.

EXAMPLE I

A 3-gram portion of 2-methylbenzothiazole was mixed with 2 grams of propylene dibromide and the mixture heated for twelve hours at 130°–140° C. The product was a white crystalline solid. It dissolved in pyridine and can be condensed in such a solution with ethyl orthoformate, as described in copending application Serial No. 409,433 filed September 3, 1941, to form dyes.

EXAMPLE II

A mixture of 3 grams of 2-methylbenzothiazole and 2 grams of propylene dibromide was heated for 4 hours at 130° C. The product was a white crystalline solid. It dissolved in pyridine and can be condensed in such a solution with ethyl orthoformate, as described in copending application Serial No. 409,433 filed September 3, 1941, to form dyes.

EXAMPLE III

Three grams of 2-methylbenzothiazole were mixed with 2.44 grams of hexamethylene dibromide and heated to 130° C. for 4 hours. The product was a white crystalline solid. It dissolved in pyridine and can be condensed in such a solution with ethyl orthoformate, as described in copending application Serial No. 409,433 filed September 3, 1941, to form dyes.

EXAMPLE IV

*N,N'-propylene-bis-(2-methylbenzothiazole bromide)*

A mixture of 7.5 grams of 2-methylbenzothiazole and 5.0 grams of 1,3-dibromopropane were heated in a sealed tube for 48 hours to 120° C. The resulting solid was dissolved in alcohol, charcoaled, recrystallized from alcohol, and dried. Analysis of the product gave the following results:

Moisture (dried in a vacuum desiccator over $P_2O_5$, in an atmosphere of nitrogen, at 100° C.) 6.69%—theoretical for bis salt dihydrate 6.71%.
Bromine 30.15%; N—30.20%; bromine corrected for moisture 32.30%—theoretical bromine for bis salt 32.0%.

EXAMPLE V

*N,N'-ethylene-bis-(2-methylbenzothiazole bromide)*

A mixture of 15.0 grams of 2-methylbenzothiazole and 9.4 grams of 1,2-dibromoethane were heated together to 125° C. for 5 days. The solid was taken up in alcohol, decolorizing charcoal was added and the solution filtered, and the filtrate evaporated to dryness. The salt formed was hygroscopic and it was therefore necessary to keep it in a vacuum desiccator until used.

EXAMPLE VI

*N,N'-hexamethylene-bis-(2-methylbenzothiazole bromide)*

Nine and eight-tenths parts of 1,6-dibromohexane and 14 parts of 2-methylbenzothiazole were heated together on a steam bath under reflux for 4 days. The solid obtained was dissolved in a small amount of water, the water solution was washed thoroughly with ether, and the solid was reprecipitated from the water solution by adding a large excess of acetone. The solid, hexamethylenebis-(2-methylbenzothiazole bromide) was filtered out, washed with acetone and dried in a vacuum disiccator. Analysis: bromine 29.42%. Theoretical bromide 29.50%.

EXAMPLE VII

*N,N'-ethylene-bis-(2,5-dimethylbenzoselenazole bromide)*

Ten grams of 2,5-dimethylbenzoselenazole were mixed with 5 grams of 1,2-dibromoethane and the mixture was heated in a sealed tube on a steam bath for 48 hours. The product was recrystallized from a large amount of alcohol and had a melting point above 230° C.

It is to be understood, however, that the invention as outlined above is not limited to the reaction of heterocyclic nitrogen bases containing a single heterocyclic nuclei with the polyfunctional reagents to produce polyplex or bis-type salts. On the contrary, it is equally applicable to the bis-azoles such as the benzo-bis-thiazoles, -oxazoles, iminazoles and -selenazoles whereby a decidedly novel type of polymeric salt is formed which may be condensed with other heterocyclic nitrogen compounds or with themselves in the manner described above to produce novel dyes. Suitable specific bis-azoles include:

(1) 2,6-dimethyl-para-beta-benzobisthiazole:

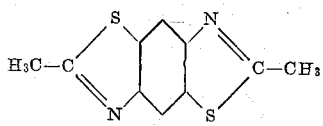

(2) 2,6-dimethyl-meta-alpha-benzobisthiazole:

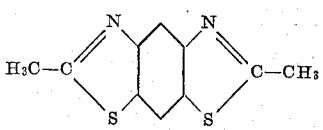

(3) 2,7-dimethyl-meta-beta-benzobisthiazole:

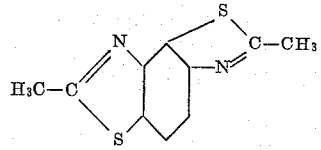

(4) 2,6-dimethyl-para-beta-selenazolobenzothiazole:

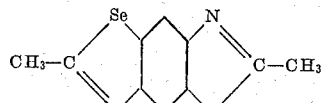

(5) 2,6-dimethyl-para-beta-benzobis-selenazole:

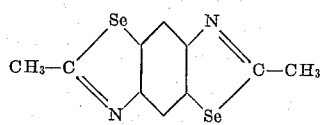

(6) 2,6-dimethyl-meta-alpha-benzobis-selenazole:

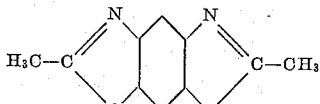

(7) 2,7-dimethyl-meta-beta-benzobisoxazole:

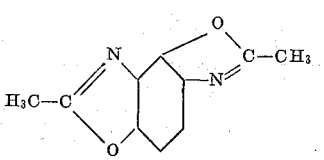

Similarly in place of 2-methylbenzthiazole can be substituted a legion of other heterocyclic nitrogen bases which contain reactive groups and are capable of forming alkyl salts in similar amounts. Suitable specific bases include alpha picoline, gamma picoline, 2,6 lutidine, 2,4 lutidine, 2,5 lutidine, 2-methylbenzoxyazole, 2-methyl-beta-naphthoxazole, 2-methylbenzselenazole, 2-methyl-beta-naphthothiazole, 1-methyl-alpha-naphthothiazole, 2-methyl thiazole, 2-methyloxazole, 2-methyl-6-aminobenzothiazole, 2-methyl-5-amino-benz-thiazole, 2,6-dimethyl-5-amino-benz-thiazole, 2,4-dimethyl-6-amino-benz-thiazole, 2,4,6-trimethyl-7-amino-benz-thiazole, 2-methyl-6-diethylamino-benz-thiazole, 2-methyl-5-dimethylamino-benz-thiazole, 2,4-dimethyl-6-phenylamino-benz-thiazole, 2-methyl-6-acetylamino-benzthiazole, 2,4,6-trimethyl-7-acetylamino-benzthiazole, 2,5-dimethyl-4-acetyl thiazole, 2,5-dimethyl-4-benzoyl thiazole, 2,5-dimethyl-4-picolinyl thiazole, 2,5-dimethyl-4-thiazole carboxyanilide, 2-methyl-5-(2-pyridyl)-4-thiazole carboxylanilide, ethyl-2,5-dimethyl-4-thiazole carboxylate, 2-methyl-4-furylthiazole, 2-methyl-4-furyl thiazole, 2-methyl-4-thienyl thiazole, 2-methyl-4-(2-pyridyl) thiazole and the corresponding oxazoles and selenazoles, 2-methyl-5-ethoxy benz-thiazole, 2,5,5-trimethyl-benzselenazole, 2-methyl-5:6-dimethoxy-benz-thiazole, 2-methyl-5-methoxyselenazole, 2-methyl-6-ethoxy-benz-thiazole, 5:6-diethoxyl benzthiazole, α-methyl-4:5-methylene-dioxy benz-thiazole, lepidine, 6-methyl lepidine, 1,3,3-trimethyl-2-methylene indoline, N-ethyl-2-methylene dihydroquinoline, N-ethyl-6,7-dimethyl-2-methylene dihydroquinoline, N-methyl-2-methylene benzthiazole, N-methyl-6-chloro-2-methylene dihydroquinoline, 1,3,3-trimethyl-2-methylene naphthindoline, 2-methyl thiazoline, 2-methyl selenazoline, 2,6-dimethyl pyridine, 2,6-dipropyl pyridine, 2 methyl-6-ethyl pyridine, 2,4,6-trimethyl pyridine, 2,6-dimethyl-4-phenyl pyridine, 2,6-dimethyl-4-benzyl-pyridine.

A large number of polyfunctional organic compounds can be used in the preparation of the bis-type or polyplex salts. A group of useful compounds include the following:

A. Polyhalogen substituted alkanes such as methylene dibromide, methylene dichloride, ethylene dibromide, propylene dibromide-1,2, butylene dichloride, ethylene and propylene di-iodides, iso-butyl dibromide, tri-iodo-triethyl methane, bromoform, acetylene tetrabromide, hexabromethane, and aromatic substituted alkanes, e. g., benzylidene dichloride, xylylene dibromide, xylylene dichloride; cyclohexane dibromide-1,2, -1,3 and 1,4, etc.

B. Alkyl esters of alkylene and cycloalkylene sulfonic acids, such as methane disulfonic dimethyl ester, ethane and alpha-β disulfonic diethyl ester, ethane α:α disulfonic dimethyl ester, the diethyl ester of ethane α:β disulfonic acid, α:β propane disulfonic diethyl ester, α:β propane disulfonic diethyl ester, β-methyl propane, α:β disulfonic dimethyl ester, the diethyl esters of (n-hexane-, n-heptane) and n-octane disulfonic acids, methane trisulfonic triethyl ester, ethane α:α:β trisulfonic triethyl ester, propane α:β:γ trisulfonic triethyl ester, etc.

C. Alkyl esters of arylene sulfonic acids such as the diethylester of phenyl disulfonic acid, the dimethyl ester of naphthalene disulfonic acid, the dimethyl ester of diphenyl disulfonic acid, the triethyl ester of phenyl tri-sulfonic acid.

D. Various alkyl disulfates such as dimethyl α:β ethane disulfate, diethyl α:β ethane disulfate, etc.

E. Esters of sulfonic acids with polyhydric alcohols, e. g., the alkyl cycloalkyl and aryl sulfonic acid esters with glycerol and the glycols. Suitable esters include:

Ethylene di(ethyl sulfonate)
Ethylene di(p-toluene sulfonate)
Ethylene di(cyclohexyl sulfonate)
p-Phenylene di-(p-toluene sulfonate)
Propylene di(p-toluene sulfonate)
Hexamethylene di(p-toluene sulfonate)

F. Mixed compounds derived from combining functional aspects of A, B, C, D, and E, such as the bromo, ethyl sulfonates of ethane.

The polyplex, e. g., bis, tris, etc. salts of this invention are useful as vulcanization aids in rubber and synthetic rubber products. They are useful chemical intermediates and especially useful as dye intermediates for the preparation of sensitizing dyes as set forth in copending applications Serial No. 409,433 filed September 3, 1941, and Serial No. 487,849 filed May 21, 1943.

As many apparently widely different embodiments of this invention may be made without departing from the spirit and scope thereof, it is to be understood that the invention is not to be limited except as defined by the appended claims.

I claim:

1. The process which comprises reacting a heterocyclic nitrogen base containing a five to six-membered heterocyclic ring, said ring having a reactive group which enters into a cyanine dye condensation in a position taken from the group consisting of alpha and gamma positions to the heterocyclic nitrogen atom with a polyfunctional organic hydrocarbon compound containing at least one non-aromatic carbon atom and a plurality of functional groups, each of which is attached to such non-aromatic carbon atom and forms quaternary ammonium salts with ternary nitrogen compounds, at least one mol of said base being used for each functional group.

2. The process which comprises reacting at least two mols of a heterocyclic nitrogen base containing a five to six-membered heterocyclic nitrogen ring, said ring having a reactive group which enters into a cyanine dye condensation in a position taken from the group consisting of alpha and gamma positions to the heterocyclic nitrogen atom with about one mol of a bifunctional organic hydrocarbon compound containing at least one non-aromatic carbon atom and two functional groups attached to such carbon atom, each of which forms quaternary ammonium salts with ternary nitrogen compounds.

3. The process which comprises reacting at least two mols of a heterocyclic nitrogen base containing a five to six-membered heterocyclic nitrogen ring, said ring having a reactive group which enters into a cyanine dye condensation in a position taken from the group consisting of alpha and gamma positions to the heterocyclic nitrogen atom with about one mol of an alkylene dihalide.

4. The process which comprises reacting by heating together at least two mols of a benzazole base having a reactive methyl group in the alpha position to the heterocyclic nitrogen atom with about one mol of alkane dihalide of the formula $X(\text{---}CH_2\text{---})_nX$, wherein $X$ is chlorine and $n$ is 1 to 6.

5. The process which comprises reacting by heating together at least two mols of a benzazole base having a reactive methyl group in the alpha position to the heterocyclic nitrogen atom with about one mol of an alkane dibromide of the formula $Br(\text{---}CH_2\text{---})_nBr$, wherein $n$ is 1 to 6.

6. The process which comprises reacting by heating together at least two mols of a benzthiazole base having a reactive methyl group in the alpha position to the heterocyclic nitrogen atom with about one mol of alkane dihalide of the formula $X(\text{---}CH_2\text{---})_nX$, wherein $X$ is chlorine and $n$ is 1 to 6.

7. The process which comprises reacting by heating together at least two mols of a quinoline base having a reactive methyl group in the alpha position to the heterocyclic nitrogen atom with about one mol of alkane dihalide of the formula $X(\text{---}CH_2\text{---})_nX$, wherein $X$ is chlorine and $n$ is 1 to 6.

8. A bis salt of the formula

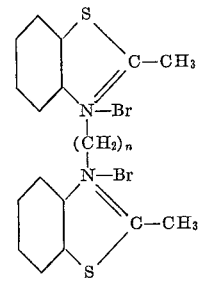

where $n$ is 1 to 6.

9. A quaternary salt of a heterocyclic nitrogen base containing two to three heterocyclic nitrogen nuclei, each of which has a five to six-membered heterocyclic nitrogen ring and contains a reactive group which enters into a cyanine dye condensation, in a position taken from the group consisting of alpha and gamma positions to the heterocyclic nitrogen atom and has a salt-forming anion attached to each such nitrogen atom.

CYRIL D. WILSON.

REFERENCES CITED

The following references are of record in the file of this patent:

UNITED STATES PATENTS

| Number | Name | Date |
|---|---|---|
| 2,242,224 | Bley | May 20, 1941 |

FOREIGN PATENTS

| Number | Country | Date |
|---|---|---|
| 441,624 | Great Britain | Jan. 23, 1936 |

Certificate of Correction

Patent No. 2,425,774.  August 19, 1947.

CYRIL D. WILSON

It is hereby certified that error appears in the printed specification of the above numbered patent requiring correction as follows: Column 2, lines 43 to 55 inclusive, strike out the left-hand structural formula and insert instead the following:

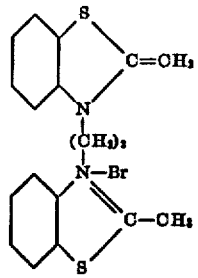

and that the said Letters Patent should be read with this correction therein that the same may conform to the record of the case in the Patent Office.

Signed and sealed this 16th day of March, A. D. 1948.

[SEAL]

THOMAS F. MURPHY,
*Assistant Commissioner of Patents.*